United States Patent Office 3,044,989
Patented July 17, 1962

3,044,989
SEGMENTED COPOLYMERS
Joseph Clois Shivers, Jr., West Chester, Pa., assignor to
E. I. du Pont de Nemours and Company, Wilmington,
Del., a corporation of Delaware
No Drawing. Filed Aug. 5, 1958, Ser. No. 753,180
16 Claims. (Cl. 260—77.5)

This application is a continuation-in-part of my copending application Serial No. 485,291, filed January 31, 1955, now abandoned.

This invention relates to a new class of linear nitrogen-containing copolymers and especially to the elastic products obtained from certain of these compositions. This invention also relates to films and other shaped articles, particularly filaments, prepared from these copolymers.

Attempts are constantly being made to improve polymers utilized in such end-use applications as fibers, filaments, bristles, films, woven and non-woven fabrics, felts, papers, molded objects, and the like. For example, intense efforts have been made in recent years to improve the dyeability and the wearing comfort of the synthetic fibers. One approach has been to attempt to modify suitably the properties of the polymers which have gained commercial acceptance. A more difficult but potentially more fruitful long range approach is to synthesize new polymers free of the deficiencies of those now available. There is a particular need in textile and allied fields for a synthetic material to replace rubber, which, in textile applications, has a number of disadvantages that tend to offset its desirable elastic properties. It is, therefore, desirable to find a new material which is highly elastic, has a higher modulus and is more abrasion resistant than rubber, but which does not possess its undesirable characteristics.

An object of this invention, therefore, is to provide new synthetic materials capable of being formed into shaped articles, such as filaments, bristles, fibres, films, molded objects, papers, felts, and similar structures. Another object is to provide linear synthetic polymers, which are particularly adapted to the preparation of filaments, especially those with high elastic recovery. A further object is to provide polymers which are suitable for replacing rubber in textile applications but which are substantially free of the disadvantages that rubber has in this field. Another object is to prepare copolymers which have both a high polymer melt temperature and a low second order transition temperature. A further object is to provide methods for preparing these polymers. These and other objects will be evident as the description of the invention proceeds.

The objects of this invention are accomplished by utilizing rapid, smooth polymerization techniques to produce segmented, substantially linear polymers of the desired chemical composition and physical characteristics. As will be seen, the segmented, substantially linear polymers consist essentially of alternating first and second segments connected through amide or urea linkages, said first segment being a polymer melting below 50° C. and having a molecular weight above about 600, said second segment being at least one repeating unit of a polymer having nitrogens in the polymer chain but no adjacent nitrogens and having a melting point above about 200° C. in its fiber-forming molecular weight range. Thus, the segmented polymer is an intralinear nitrogen-containing polymer made up of non-bisureylene high melting or "hard" segments having nitrogen atoms in the form of urea, amide or urethane groups or their thio derivatives, which "hard" segments are chemically bonded by amide or urea groups to low melting or "soft" segments.

The segmented polymers of this invention may be represented by the following formula $$\{L-S-L-H_x\}_p$$

wherein S represents the soft segment, being the residue on removal of the functional groups from a difunctional polymer with a molecular weight over 600 and a melting point below 50° C., such as $H_2N-S-NH_2$, $ClCO-S-COCl$ and $HOOC-S-COOH$; L is the linking amide group, $-CO-NH-$, or urea group, $-NH-CO-NH-$, $H_x$ is the hard segment, in which H is the repeating unit of a polyamide having recurring $-CO-NH-$ groups in the polymer chain, or of a polyurea having recurring $-NH-CO-NH-$ groups in polymer chain, or of a polyurethane having recurring $-O-CO-NH-$ groups in the polymer chain (in each case the recurring groups are connected to carbon atoms of the polymer chain); $x$ is a number not less than one; and $p$ is a large whole number.

The linear segmented copolymers of this invention may be defined more particularly as consisting essentially of a multiplicity of segments of two classes connected by chemical linkages. The segments of the first class, i.e., the soft segments, are the residues remaining after removal of the terminal amine groups of a difunctional amine-terminated polymer selected from the class consisting of amine, acid, and acid halide groups. The difunctional polymer must have a melting point below about 50° C. and a molecular weight above about 600. The residues constitute at least about 48% by weight of the segmented copolymer. The second class of segments, i.e., the hard segments, contains at least one repeating unit of a fiber-forming polymer having a melting point above about 200° C. in the fiber-forming molecular weight range. The repeating units of the fiber-forming polymer having the formula $-B-Q-A-Q$, wherein $-A-$ and $-B-$ are bivalent organic radicals, the radical $-A-$ containing terminal nitrogen atoms to each of which is attached one of the indicated free valences of the said radical $-A-$, and Q is a bivalent radical selected from the group consisting of

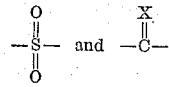

where X is oxygen or sulfur. At least some of the segments of the second class are connected by chemical linkages selected from the group consisting of

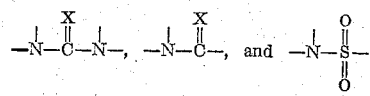

wherein X has the significance defined above, through an $$-\overset{|}{N}-$$

of said linkages to a terminal carbon atom of the segments of the first class. The segmented copolymer is free of nitrogen-to-nitrogen bonds in the polymer chain.

The techniques that can be used in preparing the polymers may be melt, solution, and interfacial polymerizations. The physical make-up of the segmented polymer is such that it has a high melt temperature and a low second order transition temperature. This is the first time polymers of the type described herein and having these characteristics have been prepared. Physically, the polymer is composed of at least two segments: one segment which is high melting and represents one or more repeating units of a polyamide, polyurethane, or polyurea which melts above 200° C. in the fiber-forming molecular weight range (about 10,000 or higher) and the second segment, chemically bonded to the first, which is also polymeric in nature but has a melting point below about 50° C.

In some instances the presence of these segments is shown graphically in the X-ray diffraction patterns and studies of the polymers of this invention. The segments can be readily selected from a large list of known polymers or components thereof, the melting points and crystalline characteristics of which are known or are readily determined. It is not necessary to start with such polymers and, in fact, the monomers are generally used, these monomers being condensed in any desired sequence. Since the final products contain polymeric sections derived from different chemical structures, they are copolymers. The amounts of the components are regulated and the elastomers which result are very readily shaped into elastic filaments.

Thus, the process of this invention involves reacting at least two difunctional monomers, one of which monomers has reactive end groups containing nitrogen, to form a segment of a high melting polymer which segment has reactive end groups. These are reacted with a low melting, low molecular weight difunctional polymer. The resultant linear nitrogen-containing polymers comprise an intralinear nitrogen-containing segment in which there are no two adjacent nitrogens derived from a high melting polymer and a second segment derived from a low melting polymer, the segments being bonded by urea or amide linkages.

This invention provides polymers containing (1) units or segments of an amide, a thioamide, a urethane, a thiourethane, a urea, or a thiourea polymer or copolymer, which in the non-segmented state has a polymer melt temperature above 200° C. in the fiber-forming molecular weight range, chemically united through amide or urea linkages to (2) a difunctional polymer with a molecular weight above about 600 (preferably between about 800 and about 5000) and a melting point below about 50° C. The term "amide" includes both carbonamide and sulfonamide linkages.

One of the monomers used to produce the "hard" segment (1) generally will be a diamine. The divalent organic radicals derived by removing one hydrogen atom from each of the nitrogen atoms of these diamines represents less than 50% of the total number of divalent organic radicals in the entire copolymer composition. Usually, the products of composition (1) will be homopolymers, but many monomers leading to copolymers are suitable. The macromolecular difunctional polymer (2) will have amine, carboxyl, or acid halide ends, and the copolymers of this invention are prepared under conditions such that the macromolecule will always be chemically united to the other component by means of an amide or urea linkage. If the macromolecule does not have in its readily available form end groups capable of forming the desired amide or urea linkage with the end groups in the "hard" segment, appropriate end groups are easily obtained through reaction with a diacid chloride or a diamine depending upon the nature of the end group of the molecule to be used as the macromolecule. Component (2) is also usually a homopolymer, but frequently it is desirable to use a copolymer to modify the melting or solubility or other characteristics.

Compositions which contain about 10% to about 40% by weight of the high melting segment or, conversely, about 60% to about 90% of the segment derived from the macromolecule will be elastomers. The processes described herein can be used for making polymers outside this range but the filaments therefrom, although useful, are not the preferred elastic filaments described in the following paragraph. It has been found that the best elastomers are produced when the difunctional macromolecule, for example, a polyether glycol or its amide-forming derivative, forms a segment which is substantially amorphous at room temperature as determined by X-ray characterization. Elastomers yielding fibers having a fiber-stick temperature above 150° C. are preferred for filament formation.

The elastic compositions of this invention show high elastic recover (above 90%), low stress decay (below 20%), and frequently have a higher modulus than rubber, which is the nearest known equivalent in terms of elastic properties. Elastic recovery or tensile recovery is the percentage return to original length within one minute after the tension has been released from a sample which has been elongated 50% at the rate of 100% per minute and held at 50% elongation for one minute. Stress decay is the percent loss in stress in a yarn one minute after it has been elongated to 50% at the rate of 100% per minute.

The "hard" segment or high melting component of the segmented polymers is made up of units of a polymer, but as has been indicated previously, it is not essential that this be a homopolymer. The high melting component may be made of one type of unit or a majority of one type; in the latter event there may be present one or more of the other types of amide, urea, or urethane polymeric units. The units in the chain may be distributed in such a manner that no single type represents a majority. The essential feature is that the combination of units must have a melting point above 200° C. when the molecular weight is high enough to be in the fiber-forming range. Usually, high-melting polymers are obtained most readily when homopolymers are prepared and these are preferred. The preferred chain length of the "hard" segment depends upon the melting point of the high melting component and also, to some extent, upon the molecular weight of the macro-intermediate. As the chain length decreases, it is preferable that the "hard" segment be a unit of a higher melting polymer, in order to obtain the desirable properties associated with the polymers of this invention. This is particularly true for the elastic compositions. When the chain length of the high melting component is reduced to the minimum (i.e., the macromolecular segments are separated by only a single unit of the polymer), it is preferred that it be the repeating unit of a polymer with a melting point above 250° C. in the fiber-forming molecular weight range.

The difunctional macro-intermediate may be a homopolymer or a copolymer. The most essential features are that it be difunctional and have a melting point below about 50° C. These macromolecules may contain a single type of linkage, such as the ether linkages in the poly (alkylene oxide) glycols or the ester linkages in polyesters or they may have more than one type of linkage, as in the polyoxathiaalkylene glycols. Even where the linkages are the same, the compositions may be copolymers, such as a copolyester or a copolyether. Copolymer formation is a useful method for modifying a difunctional macromolecule which melts too high to be useful in the process. Copolymers usually melt lower and show less tendency to produce undesirable crystallization in this segment of the final copolymer than do the homopolymers from which they are derived.

These macrointermediates may have any type of end groups, as long as they are capable of reacting with one of the monomeric constituents of the high-melting component to form an amide or urea linkage. For example, the end groups may be acid halides, acids, amines, etc. It is preferred that both ends of this molecule be the same, since reaction conditions are more complicated when they differ. Furthermore, only small amounts of other linkages between the segments other than amide or urea, such as the urethane linkage, should be present in the final copolymer. One of the advantages of this invention is that segmented polymers may be made which contain the more stable amide group between the macrointermediate and the high-melting component, rather than the urethane group. This makes it possible to melt spin many of the compositions of the invention. Polyethers, polyhydrocarbons, N-alkylated polyurethanes and certain polyesters have been found to be the most satisfactory macro-intermediates for elastomers.

A number of combinations can be made to produce the structures and compositions of this invention. Some of these are illustrated in the following generalized examples.

(1) A macrodiamine plus a diacid halide plus a low molecular weight diamine to produce an amide "hard" segment connected to the macrointermediate through amide linkages. (2) A macrodiamine reacted with 2 mols of a diacid halide, a diamine, and a bis(haloformate) to produce a urethane "hard" segment connected to the macrointermediate through amide linkages. (3) A macrodiamine plus 2 mols of a diacid halide, a diamine, and the biscarbamyl halide of a diamine to produce a urea "hard" segment connected to the macrointermediate through amide linkages. (4) A macrodiamine, a diamine of equal reactivity, and an organic diiocyanate to produce a urea "hard" segment connected to the macrointermediate through urea linkages. (5) A macrodiamine plus the reaction product of a diol and an organic diisocyanate to produce a urethane "hard" segment connected to the macrointermediate through urea linkages. In the preceding and hereinafter, the term "diacid halide" is intended to include carbonyl and sulfonyl halides.

The scope of the invention is readily understood by referring to the following examples which are given for illustrative purposes only and should not be considered to represent the limits of the invention.

*Example I*

Poly(ethylene oxide) glycol with a molecular weight of 600 was reacted with nine molar equivalents of acrylonitrile at 18–21° C. in the presence of benzyltrimethylammonium hydroxide as a catalyst. The acrylonitrile was added over a period of 3¼ hours. The reaction was quenched with dilute hydrochloric acid and the dark orange, viscous homogeneous reaction mixture was poured into methanol. The yellow precipitate obtained was filtered and the filtrate was decolorized with activated carbon. A dark yellow syrup was obtained after removal of all of the solvent under vacuum. This was dissolved in chloroform and extracted with water to produce a product with a lighter color.

One hundred grams of this dinitrile was hydrogenated in the presence of freshly prepared base-free Raney nickel for seven hours at 100° C. and 1500 p.s.i. The slightly yellow liquid obtained had a neutral equivalent of 350 (theoretical value equals 354), indicating a molecular weight of 700. This diamine (8.52 grams) was placed in a polymerization tube with 2.50 grams of suberic acid and 7.88 grams of the salt obtained by reacting piperazine with suberic acid. The tube was evacuated and purged with nitrogen repeatedly and then sealed under vacuum. The tube was heated for two hours at 215° C. and was then cooled, opened, and provided with a nitrogen bleed. The contents of the tube were heated at 218° C. under atmospheric pressure for approximately 20 minutes. The temperature was then raised to 259° C. and the heating continued for twenty minutes under atmospheric pressure. The tube was then evacuated to approximately 0.1 mm. and heating continued at 259° C. for four hours.

The copolyamide obtained had an inherent viscosity of 1.63 and contained 40% by weight of piperazine suberamide units and 60% by weight of units obtained from the reaction of bis(aminopropyl) poly(ethylene oxide) with suberic acid. This was melt spun to produce a filament which was drawn 7.5×, heat-set at 105° C. in air, and relaxed at 95° C. in air. The resulting filaments had a tenacity of 0.6 g.p.d., an elongation of 110%, an initial modulus of 0.32 g.p.d., a tensile recovery of 96%, and a stress decay of 9%.

*Example II*

A diamine was prepared by reacting a poly(propylene oxide) glycol of the general formula:

with an excess of acrylonitrile in the same manner as described in Example I. This dinitrile was reduced as described there to produce the corresponding diamine with a molecular weight of approximately 2210. This diamine (16.79 grams) was mixed with 1.67 grams of sebacic acid and 8.75 grams of the salt obtained by reacting hexamethylene diamine with sebacic acid. o-Phenylphenol (63 grams) was added as a flux and the composition polymerized under conditions similar to those described in Example I.

The copolyamide contained 30% by weight of hexamethylene sebacamide and 70% by weight of units derived from the reaction of sebacic acid and bis(aminopropyl) poly(propylene oxide) and had an inherent viscosity of 0.73. The polymer was melt spun to produce filaments which were drawn 6× and heat-set. The resulting filaments had a zero strength temperature of 179° C., a fiber stick temperature of 155° C., a tenacity of 0.48 g.p.d., an elongation of 190%, an initial modulus of 0.31 g.p.d., a stress decay of 12%, and a tensile recovery of 95%.

*Example III*

A diamine equivalent to that of Example II was prepared from another sample of poly(propylene oxide) by the same procedure. The resulting diamine had a molecular weight of 1970 as determined by measuring neutral equivalents. This diamine (12.68 grams) was mixed with 0.93 gram of adipic acid, 10.32 grams of the salt of hexamethylene diamine and adipic acid, and 50 grams of o-phenylphenol. This composition was polymerized as in the preceding examples to yield a polymer with an inherent viscosity of 0.77. The copolyamide contained 40% by weight of hexamethylene adipamide units and 60% by weight of units derived from the reaction of bis(aminopropyl) poly(propylene oxide) and adipic acid. This polymer was melt spun and cold drawn approximately 3.5× to produce filaments with a tenacity of 0.8 g.p.d., an elongation of 110%, an initial modulus of 0.8 g.p.d., a stress decay of 17%, a tensile recovery of 93%, and a fiber stick temperature of 214° C.

*Example IV*

A polymer similar to that of the preceding example was prepared by reacting 14.46 grams of the diamine derived from acrylonitrile and poly(propylene oxide) glycol with 1.06 grams of adipic acid and 5.89 grams of hexamethylene diammonium adipate salt in the presence of 50 grams of o-phenylphenol as the flux. The copolyamide obtained had an inherent viscosity of 0.72 and contained 25% by weight of hexamethylene adipamide units and 75% by weight of units derived from the reaction of bis(aminopropyl) poly(propylene oxide) and adipic acid. This polymer was melt spun, drawn 5× at room temperature and heat-set to produce filaments with a tenacity of 0.4 g.p.d., an elongation of 170%, an initial modulus of 0.019 g.p.d., a stress decay of 13%, a tensile recovery of 95%, and a fiber stick temperature of 194° C.

*Example V*

A macrodiamine was prepared by reacting poly(tetramethylene oxide) glycol with an excess of acrylonitrile and reducing. This diamine (19.20 grams), which had a molecular weight of approximately 1200, was condensed in the presence of 70 grams of o-phenylphenol as a flux with 3.24 grams of sebacic acid and 7.98 grams of the salt obtained by reacting sebacic acid with a mixture of bis(p-aminocyclohexyl) methanes containing more than the equilibrium amount of trans-isomer. The copolyamide obtained had an inherent viscosity of 0.98 and contained 25% by weight of units derived from the reaction of bis(p-aminocyclohexyl) methane with sebacic acid and 75% by weight of units derived from the reaction of bis(aminopropyl) poly(tetramethylene oxide) and sebacic acid. The polymer was melt spun, drawn 6×, and heat-set to produce filaments with a tenacity of 0.4 g.p.d., an elongation of 320%, an initial modulus of 0.2 g.p.d., a stress decay of 11%, and a tensile recovery of 94%.

*Example VI*

The macrodiamine from Example V (14.97 grams) was condensed with 1.80 grams of adipic acid and 6.30 grams of hexamethylene diammonium adipate salt in the presence of 54 grams of o-phenylphenol. The copolyamide obtained had an inherent viscosity of 0.85, and contained 25% by weight of hexamethylene adipamide units and 75% by weight of units derived from the reaction of the macrodiamine with adipic acid. This was melt spun and drawn 6.5× to produce filaments with a fiber stick temperature of 171° C., a tenacity of 0.39 g.p.d., an elongation of 390%, an initial modulus of 0.24 g.p.d., a stress decay of 12%, and a tensile recovery of 92%.

*Example VII*

Isobutylene-butadiene copolymers containing small percentages of butadiene were oxidized with nitric acid and ammonium vanadate to produce dicarboxylic acids with a molecular weight of approximately 3000. These were converted to the corresponding diacid chlorides by reacting with an excess of thionyl chloride. This diacid chloride (15 grams) was dissolved in 115 ml. of benzene and mixed vigorously in a blender with 75 ml. of an aqueous phase containing 6.57 grams of hexamethylene diamine and 14.5 grams of sodium carbonate to react with the liberated hydrogen chloride. At the end of one minute, 12.7 grams of sebacyl chloride in 110 ml. of benzene was added. Vigorous stirring was continued until a polymer with an inherent viscosity of 1.2 was obtained. This copolyamide contained approximately 51% by weight of hexamethylene sebacamide units and 49% by weight of units derived from the reaction of hexamethylene diamine with the polyisobutylene diacid chloride. A tough film was obtained by casting an m-cresol solution of this polymer.

*Example VIII*

A polymer was obtained by reacting 15 grams of polyisobutylene diacid chloride dissolved in 115 ml. of benzene with 8.98 grams of hexamethylene diamine dissolved in 75 ml. of an aqueous phase containing 12.0 grams of sodium carbonate. After vigorous stirring for one minute in a blendor, 9.31 grams of terephthaloyl chloride dissolved in 110 ml. of benzene was added and stirring continued until a polymer with an inherent viscosity of 1.05 was obtained. This copolyamide contained 52% by weight of hexamethylene terephthalamide units and 48% by weight of the polyisobutylene amide units.

*Example IX*

Polyisobutylene diacid chloride (15 grams) dissolved in 115 ml. of benzene was reacted by stirring vigorously with 75 ml. of an aqueous solution containing 9.72 grams of bis(p-aminocyclohexyl) methane and 9.8 grams of sodium carbonate. After stirring for one minute, 8.51 grams of terephthaloyl chloride dissolved in 110 ml. of benzene was added and stirring continued until a polymer having an inherent viscosity of 1.20 was obtained. This copolyamide contained 50% by weight of methylenebis(p-cyclohexylene) terephthalamide units and 50% by weight of amide units derived from the reaction of bis(p-aminocyclohexyl) methane with polyisobutylene diacid chloride. Tough films were obtained by casting m-cresol solutions of this polymer.

In each of the last three examples, the polyisobutylene diacid chloride was added about one minute before the other acid chloride to produce more uniform copolymers, since the reaction rate of the polyisobutylene diacid chloride is appreciably slower.

*Example X*

Azelaic acid was heated with a 40 mol percent excess of N,N'-diisobutylhexamethylenediamine for 21 hours at 218° C. under atmospheric pressure and for three hours at 218° C. under reduced pressure. A macrodiamine was obtained having by analysis 1235 >NH groups and 67 —COOH end groups per million grams of polymer, indicating a molecular weight of 1540. This macrodiamine (12.0 grams) was dissolved in 100 ml. of methylene chloride, and this solution was emulsified with vigorous stirring with 5.7 grams of trans-2,5-dimethylpiperazine and 5.7 grams of sodium hydroxide dissolved in 175 ml. of water in a blender. A solution of 10.15 grams of terephthaloyl chloride in 100 ml. of methylene chloride was then added. After the reaction had proceeded for thirty minutes at room temperature, a polymer with an inherent viscosity of 0.92 in m-cresol was obtained in 92% yield. The polymer was extracted with acetone and films cast from trichloroethane/formic acid solutions of the extracted polymer. Strips of this film had a tenacity of 0.44 g.p.d., an elongation of 235%, an initial modulus of 2.8 g.p.d., a stress decay of 39%, and a tensile recovery of 26%. This polymer contained 50% by weight of dimethylpiperazine terephthalamide units and 50% by weight of the macrodiamine.

*Example XI*

Azelaic acid was reacted with a 40% molar excess of a mixture containing three mols of N-isobutylhexamethylenediamine for each mol of N,N'-diisobutylhexamethylenediamine. This reaction mixture was heated for sixteen hours at 245° C. under atmospheric pressure and for eight hours at 245° C. under reduced pressure. The polymer isolated had a molecular weight of 1480 and an amine end/carboxyl end ratio of 84/1. This macrodiamine (15.0 grams) was dissolved in 150 ml. of chloroform. Sebacyl chloride (7.4 grams) in 50 ml. of chloroform was mixed for one minute with this solution and the resulting solution added with vigorous stirring to a blender containing a solution of 7.0 grams of triethylamine and 4.0 grams of hexamethylene diamine in 50 ml. of chloroform. After twelve minutes of reaction at room temperature, a polymer with an inherent viscosity of 1.16 in m-cresol was obtained in 78% yield. This polymer contained approximately 35% by weight of hexamethylene sebacamide units and 65% by weight of the macrodiamine.

This polymer was melt spun to produce filaments which were drawn 5.3× and boiled off under tension. They had a tenacity of 0.95 g.p.d., an elongation of 165%, an initial modulus of 0.17, a stress decay of 19%, and a tensile recovery of 90%.

*Example XII*

To a mixture containing 31 grams of N,N'-diethylhexamethylenediamine and 59 grams of calcium hydroxide in 500 ml. of dry benzene is added 34 grams of the bischloroformate of 2,2-dimethyl-1,3-propanediol in 500 ml. of dry benzene with stirring. The mixture is stirred for 8–16 hours and is filtered. The filtrate is concentrated and the residual viscous liquid heated at 100° C. at 1 mm. pressure for 16 hours. The amine-terminated N-alkylated polyurethane obtained in 84% yield is a white viscous liquid containing by analysis 668 amino groups per million grams of polymer, indicating a molecular weight of approximately 3000.

The above-described N-alkylated polyurethane (30.0 grams) and 5.03 grams of 2,5-dimethylpiperazine are dissolved in 100 ml. of N,N-dimethylformamide. The solution is cooled to 0° C., and there is added with stirring a solution of 13.33 grams of p,p'-methylenediphenyl diisocyanate in 15 ml. of dimethylformamide. There is obtained a viscous solution of a segmented polymer containing approximately 62% of N-alkylated polyurethane segments. Tough, elastic films are obtained from this solution by casting.

*Example XIII*

A solution of 15 grams of p,p'-methylenediphenyl diisocyanate and 11.3 grams of p,p'-diphenylolpropane in 75 ml. of dimethylformamide is heated for 3 hours at 100° C. To the solution of isocyanate-terminated polyurethane so obtained is added 30 grams of the amine-terminated N-alkylated polyurethane described in Example XII dissolved in 35 ml. of dimethylformamide. The mixture is heated at 100° C. for an additional 3 hours. There is obtained a viscous solution of a segmented polymer containing approximately 53% of N-alkylated polyurethane segments. Elastic films are obtained from the solution.

*Example XIV*

An amine-terminated polyisoprene having a molecular weight of approximately 1640 is obtained by polymerizing isoprene according to the method described in U.S. 2,647,146. A solution of 8.2 grams of this amine-terminated polyisoprene in 25 ml. of benzene is added to a solution of 3.75 grams of p,p'-methylenediphenyl diisocyanate in 50 ml. of benzene. The mixture is stirred for 25 seconds and there is added a solution of 1.14 grams of 2,5-dimethylpiperazine in 25 ml. of benzene. The mixture is then stirred for 15 minutes, and there is obtained 11.9 grams of a polymer having an inherent viscosity of 0.63 and containing by analysis 7.30% nitrogen. These data indicate a segmented polymer containing approximately 73% of polyisoprene segments.

*Example XV*

An amine-terminated N-alkylated polyurethane is prepared according to the method described in Example XII from N,N'-diisobutylhexamethylenediamine and the bischloroformate of 2,2-dimethyl-1,3-propanediol. The viscous polymer contains by analysis 670 amino groups per million grams of polymer, indicating a molecular weight of approximately 3000. A mixture of 2.45 grams of 2,5-dimethylpiperazine, 15.0 grams of the above-described N-alkylated polyurethane, 5.0 grams of sodium carbonate, 70 ml. of water and 70 ml. of methylene chloride is reacted in a blender with vigorous stirring with a solution of 5.35 grams of terephthaloyl chloride in 115 ml. of methylene chloride. There is obtained in 90% yield a segmented polymer having an inherent viscosity of 1.55 and containing approximately 75% by weight of low-melting N-alkylated polyurethane units linked through amide groups to a high-melting polyamide. The segmented polymer has a polymer melt temperature of 300° C. Film strips obtained by casting trichloroethane/formic acid (60/40) solutions of this polymer have the following properties: tenacity 0.20 g.p.d., elongation 625%, initial modulus 0.10 g.p.d., stress decay 18%, tensile recovery 93%.

"Polymer melt temperature" is the minimum temperature at which a sample of the polymer leaves a wet, molten trail as it is stroked with moderate pressure across a smooth surface of a heated brass block. "Polymer melt temperature" has sometimes in the past been referred to as "Polymer stick temperature." "Fiber-stick temperature" is the temperature at which the fiber will just stick to a heated brass block when held against the surface of the block for five seconds with a 200 gram weight. The "zero strength temperature" is the average temperature at which the two ends of the fiber break if heating is continued with the weight left on after the fiber stick temperature has been determined. "Initial modulus" is determined by measuring the initial slope of the stress-strain curve. The tenacity and modulus in the examples are expressed in units of grams per denier (g.p.d.).

The diamines useful in the formation of the "hard" segments of the segmented polymers are any primary or secondary aliphatic, alicyclic, heterocyclic, or aromatic diamine as long as it is properly combined with a complementary monomer to form units of a polymer which melts above 200° C. when its molecular weight is in the fiber-forming range. As representative examples may be mentioned: ethylenediamine, propylenediamine, tetramethylenediamine, pentamethylenediamine, hexamethylenediamine, heptamethylenediamine, octamethylenediamine, p-xylylenediamine, 1,4-diaminocyclohexane, p-phenylenediamine, 1-methyl-2,4-diaminobenzene, bis(p-aminocyclohexyl)methane, N,N'-dimethyltetramethylenediamine, N,N'-dimethylphenylenediamine, N,N'-dimethyl-p-xylylenediamine, N,N' - dimethyl-1,4-diaminocyclohexane, piperazine, and trans-2,5-dimethylpiperazine. The examples describe the utilization of some of these diamines. Mixtures of diamines may be used as well. Ethylenediamine, hexamethylenediamine, piperazine, and 2,5-dimethylpiperazine have been found particularly valuable for preparing many useful compositions falling within the scope of this invention. The biscarbamyl derivatives, e.g., those prepared from phosgene and any of the diamines listed, may be used to prepare suitable urea polymers. In addition, non-functional derivatives of the diamines listed may also be used as long as the substituents do not interfere with the polymerization. For example, the diamines may have hydrocarbon side chains or be substituted with halogen or nitro groups, which are inert under the conditions used herein.

Any difunctional acid or its polyamide-forming derivatives may be used as a complementary monomer. This includes aliphatic, aromatic, mixed aliphatic-aromatic, and alicyclic dicarboxylic and disulfonic acids and both of these types of acids containing heterocyclic rings. Mixtures of and mixed carbonic and sulfonic acids or their polyamide-forming derivatives may be used. As specific examples of the useful acids may be mentioned succinic, adipic, suberic, sebacic, terephthalic, hexahydroterephthalic, isophthalic, phthalic, bibenzoic, 1,5-naphthalenedicarboxylic or sulfonic acids, piperazinediacetic acid, m-benzenedisulfonic acid, hexanedisulfonic acid, and 1,2-ethanedisulfonic acid. The acids may also be substituted with groups which do not interfere with the reaction. The only important limitation is that the acids must be combined with a properly selected diamine to form units of a polymer which has a polymer melt temperature above 200° C. in the fiber-forming molecular weight range. As is shown in the examples, the acid halides have been found to be very useful amide-forming derivatives. Adipic, sebacic, terephthalic, hexahydroterephthalic, and 1,5-naphthalenedisulfonic and dicarboxylic acids and their derivatives have been found to be particularly useful.

The bis(haloformates) used with a diamine to form polyurethanes in the high melting segment can be prepared from any glycol or dihydroxy compound. This includes aliphatic, aromatic, mixed aliphatic-aromatic, cycloaliphatic, and difunctional hydroxy compounds containing heterocyclic rings. As specific examples may be mentioned the bis(haloformates) of ethylene glycol, propylene glycol, butylene glycol, o-, m-, and p-xylylene glycols, cyclohexanediol, hydroquinone, resorcinol, catechol, 4-methylresorcinol, among others. As was the case with the diamines, mixtures of the bis(haloformates) may be used or they may be substituted with groups which do not interfere with the reaction.

The nature of the difunctional macrointermediates has been discussed briefly earlier. The functional groups may be separated by hydrocarbon, polyester, polyether, polyoxathiaalkylene, polysulfide, polysiloxane, polyurethane, certain polyamides, and similar types of chains. These chains may contain aromatic groups, and they may be substituted with halogen, alkyl, nitro, alkoxy, and similar groups which are not reactive under the particular polymerization conditions being used.

The important consideration, as indicated earlier, is that the macrointermediate be difunctional and melt below about 50° C. Where the melting point of the macrointermediate is not sufficiently low or is borderline, a plasticizer having affinity selectively for the macrointermediate may be blended into the final segmented polymer in order to produce an elastic material from an otherwise non-elastic, segmented polymer, or in order to upgrade the elastic properties of an otherwise mediocre polymer. For example, the addition of 3–5% of a polymeric plasticizer, poly(propylene oxide) glycol having a molecular weight of about 2000, to a segmented polymer, the macrointermediate of which is a poly(tetramethylene oxide) glycol having a molecular weight of about 3000, greatly improves the elastic properties of the segmented polymer by virtue of the selective affinity of the plasticizer for the polyether segments of the elastomer.

Hydrocarbon chains suitable as macrointermediates include those derived from polyisobutylene. Polyisobutylene dicarboxylic acids can be prepared by the nitric acid oxidation of butadiene-isobutylene copolymers. In butadiene-isobutylene copolymers with small percentages of butadiene there are large segments of isobutylene separated by butadiene units, each butadiene unit having a double bond after polymerization. The polyisobutylene segments in copolymers containing approximately 1% unsaturation have molecular weights of 3000–4000. If these copolymers are oxidized with nitric acid, the double bonds are attacked and the products isolated are difunctional macromolecules which are essentially polyisobutylene with carboxyl ends. These products have an average molecular weight of 3300 to 3500 and good difunctionality as indicated by the agreement between the ebullioscopic molecular weight and the molecular weight calculated from end-group analysis.

Equally satisfactory are low molecular weight polyisoprene, polybutadiene, and similar derivatives terminated with amine groups. Representative macrointermediates of this class are described more fully in U.S. 2,647,146.

Low molecular weight polyesters can be prepared by reacting acids, esters, or acid halides with glycols. Suitable glycols are the polymethylene glycols, e.g., ethylene, propylene, butylene, decamethylene, etc. These glycols may be reacted with the proper mol ratio of aliphatic, cycloaliphatic, or aromatic acid or ester-forming derivatives to produce low molecular weight polymers. Suitable acids for preparing polyesters and/or copolyesters are succinic, adipic, suberic, sebacic, isophthalic, hexahydroterephthalic; the alkyl and halogen-substituted derivatives of these acids may also be used. The diacid halide derivatives of these acids have been useful in preparing "dimers" and "trimers," (i.e., low molecular weight polymers containing two or three macro glycol units) with acid halide ends, which have been particularly useful for preparing polymers by solution or interfacial polymerization methods.

In respect to the halogen compounds referred to such as acid halides and bis(haloformates), the halogen may be chlorine, bromine, iodine, or fluorine. Generally, this will be chlorine.

Polysiloxanes with molecular weights of 3000–4000 are another useful class. The first step in the preparation is the polymerization of dihalodialkylsilanes in the presence of a monobromoalkyl- or monobromoaryl-dialkylhalosilane. In general, the molecular weight of these bromine-terminated polysiloxanes is determined by the amount of chain terminator used. They are converted to nitriles and reduced to the corresponding amines or hydrolyzed to the corresponding acids prior to use in this process.

Polyurethanes having terminal amino groups also are useful as macrointermediates for this invention. Within this class the use of N-alkylated polyurethanes derived from secondary diamines is preferred. Such N-alkylated polyurethanes with the required difunctionality may be prepared by reacting the bischloroformate of a glycol with a secondary diamine in an organic solvent free of water and in the presence of an excess of metalliferous base, such as calcium hydroxide.

Preferred difunctional intermediates are those derived from the polyethers. Representative difunctional polyethers which may be used include the polyoxathiaalkylene glycols, such as poly(1,6-dioxa-9-thiahendecane), poly-(1,4-dioxa-7-thianonane), and poly(1-oxa-4-thiahexane); the poly(alkylene oxide) glycols, such as poly(ethylene oxide) glycol, poly(propylene oxide) glycol, poly(tetramethyleneoxide) glycol, and poly(decamethyleneoxide) glycol; the dicarboxymethyl derivatives of poly(tetramethylene oxide)

$$HOOCCH_2(OCH_2CH_2CH_2CH_2)_xOCH_2COOH$$

or its esters; polydioxolane and polyformals prepared by reacting formaldehyde with other glycols or mixtures of glycols, such as tetramethylene glycol and pentamethylene glycol. For the practice of this invention, polyethers having terminal hydroxyl groups may be converted to the bis(aminopropyl) derivatives by cyanoethylation followed by reduction of the dinitrile obtained. Some of the alkylene radicals in these polyethers may be substituted by arylene and/or cycloalkylene radicals.

The preferred polyethers are derivatives of the poly(alkylene oxide) glycols, which may be represented by the formula:

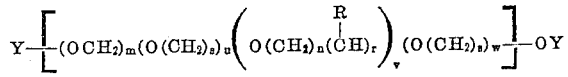

in which $m$ and $r$ are 0 or 1; $n$ is 2–10 when $r$ is 0 and 1–9 when $r$ is 1; $s$ is 0–10, $u$ and $w$ are 1–50; $v$ is 4–125; R is H or a low molecular weight alkyl group such as methyl; and Y is a terminating group with reactive ends capable of forming an amide or urea linkage, such as —NH$_2$, —COOH, or —COCl.

The preferred macrointermediate of this type is that derived from poly(tetramethylene oxide) glycol. Particularly useful are the segmented polymers formed with the following ingredients: (1) dimethyl piperazine and terephthalic acid, (2) hexamethylene diamine and adipic acid, (3) hexamethylene diamine and sebacic acid, and (4) hexamethylenediamine or ethylenediamine and terephthalic acid. The elastomers derived from this glycol, and particularly from these compositions, are of particular interest.

The polymers of this invention contain "soft" and "hard" segments joined through connecting linkages. In any given segmented polymer, the connecting linkages may be amide groups or urea groups or a mixture of amide and urea groups. The use of the amide connecting linkage is preferred, since polymers free of urea groups generally display superior color stability and improved resistance to degradation by ultra-violet light and/or high temperatures.

In this invention, several polymer structures, such as urethane, amide, and urea, and a number of different types of macromolecular chains, such as polyhydrocarbons, polysiloxanes, polyethers, and polyesters, have been found to give similar products. Under most circumstances, this would not be true, but the melting point limitations placed on the high melting segments and the melting point and molecular weight limitations placed on the macromolecular segments and the limitations placed on the linkage between these two segments has eliminated many of the differences in properties which would normally be apparent if one attempted to substitute one of these groups or structures for another in the polymers of the prior art. Furthermore, this work was directed largely toward preparing polymers which would be satisfactory as filaments, although this is obviously not the only application for these polymers. The requirements for filament formation are sufficiently stringent that the polymers of this invention are similar in properties. This is particularly true when the requirements for elastic copolymers are included.

Three methods for preparing these polymers have been described in the examples. These are: (1) melt polymerization, (2) interfacial polymerization, and (3) solution polymerization. Melt polymerization is a well-known method for preparing polymers, particularly polyamides. The only point which needs special consideration here is that melt polymerization should not be used when the difunctional macromolecule contains exchangeable linkages.

Interfacial polymerization has rapidly been attaining increased importance in the polymer field. It is a rapid, moderate temperature reaction in which the reactants are brought together in such a way that the reaction zone is at, or is immediately adjacent to, a liquid-liquid interface. Thus, most of the molecules of at least one of the reactants must diffuse through liquid diluent to arrive at the reaction zone. For example, the reactants in one liquid phase may be one or more of the diamines and the reactants in the other liquid phase may be one or more diacid halides. The two liquid phases are mixed to form a two-phase system in which the diamine and the diacid halide are in separate phases, at least one of which includes a liquid diluent. Preferably, a reactant is a liquid under the reaction conditions or is dissolved in a diluent, but one of the reactants may be dispersed or suspended as a finely divided solid in a diluent which will dissolve it at least partially. The phases are mixed until the desired condensation polymerization has taken place and then, if desired, the polymers obtained are isolated. In the foregoing discussion the term "diacid halide" is intended to include the biscarbamyl halides and the acid halide derivatives of dicarboxylic and disulfonic acids derived from either the small or the large molecules. It is also intended to cover the bis(halo-formates) of the small molecules. Although these materials are not completely equivalent in their behavior, they have been grouped together here to simplify the discussion.

Low molecular weight polymers have been prepared for some time by forming a homogeneous solution of the reactant and allowing the reaction to continue at moderate temperatures or heating to produce the polymers. However, only recently have high molecular weight polymers been prepared successfully by this method. The method used here for preparing polymers involves dissolving one or more reactants in a solvent and two or more complementary reactants in separate portions of the same solvent, and then mixing the solution in the presence of a suitable acid acceptor to form high molecular weight polymers. The molecular weight of the polymers is controlled by the choice of the solvent medium or by the use of mixtures of appropriate solvents. The solvent is one which is inert to the reactants.

For optimum results the segmented polymers or copolymers of this invention should have an inherent viscosity of the order of 0.6–4.0 or above, although copolymers having inherent viscosities as low as 0.4 are useful. Polymers in the lower molecular weight range are useful in certain applications, such as in the preparation of coatings and molded objects. However, the ones of particular interest are those with molecular weights in the fiber-forming range, i.e., above about 10,000. Inherent viscosity is defined as:

$$\frac{\ln \eta_r}{C}$$

in which $\eta_r$ is the viscosity of a dilute solution of the polymer divided by the viscosity of the solvent in the same units and at the same temperature, and C is the concentration in grams of the polymer per hundred ml. of solution. The inherent viscosities recorded here were measured in m-cresol or trichloroethane/formic acid mixtures. In most cases, a concentration of 0.5 gram per 100 ml. of solution was used. When the polymers are prepared by melt polymerization, they can be extruded in ribbon form upon a cold wheel and cut into small chips after the molten polymer has reached the desired intrinsic viscosity. When polymers are prepared by the interfacial or solution methods, the polymer frequently separates as soon as it has reached an adequate molecular weight value. If this does not happen, the polymer can be separated by the addition of a precipitating and/or coagulating agent. However, it is possible to prepare concentrated solutions of many of these polymers by the use of these techniques, and such solutions can be used directly in the preparation of filaments, films, ribbons, bristles, and similar articles.

This invention represents an important development in that it demonstrates for the first time a method for preparing polymers of this type which have both a high polymer melt temperature and a low second order or glass transition temperature. A number of rubbery polymers with relatively low second order transition temperatures have been prepared. These polymers have invariably had low polymer melt temperatures and tended to creep on extension. Therefore, it has usually been necessary to cross-link them in order to obtain good elastic properties. These limitations have restricted their usefulness. For example, the insolubility and infusibility of cross-linked products makes subsequent processing difficult. Polymers with high polymer melt temperatures also have had, in the past, high second order transition temperatures, which means that they tend to be non-elastic at room temperatures. The second order transition temperatures can be lowered and the room temperature elasticity correspondingly increased through copolymer formation. However, this has invariably led to a large drop in the polymer melt temperature. For example, the second order transition temperature of poly(ethyleneterephthalate) can be reduced from +80° C. to −20° C. by incorporation of sufficient sebacic acid to give a copolymer containing 60% by weight of ethylene sebacate units but, at the same time, this results in an undesirable drop in the polymer melt temperature from 250° C. to 115° C. In sharp contrast to this, the examples described herein show that 80% by weight of poly(tetramethylene oxide) can be incorporated into poly(hexamethylene adipamide) in the form of its bis-aminopropyl derivative and lower the second order transition temperature from +60° C. to −70° C. while lowering the polymer melt temperature from 260° C. to 200° C., a drop of only 60°.

The copolymers of this invention have properties which make them useful in many applications. Thus, they can be molded to form a variety of shaped objects, extruded to form rods, bars, tubes, films, filaments, fibers, bristles, and the like. In film form they are useful as shoe-upper leather replacements or for use in shoe soles and heels, or as safety glass interlayers. The filaments are useful in such applications as fabrics, rope, papers, felts, among other uses.

The elastic copolymers are a particularly desirable feature of this invention. The best compositions of this invention exhibit stress decay properties nearly equivalent to those of rubber. The higher tenacity, higher initial modulus, superior abrasion resistance, and more easily controlled elongation of these polymers fit them for many applications, particularly in film and filament form, for which rubber is undesirable. Most of these copolymers possess the important additional advantage that they are easily fabricated. A large percentage of the rubber threads used are prepared by slitting rubber sheets. This produces relatively large denier non-uniform filaments, which can not be converted readily into multifilaments and are not acceptable for many uses, particularly in certain fabrics. Finer denier monofilaments and multifilaments can be prepared by extruding and coagulating rubber dispersions, but this process has proved to be expensive and the product is frequently unsatisfactory. Both types of rubber filaments have poor abrasion resistance.

Some of these copolymers also possess the desirable characteristic of being hydrophilic. The ability to absorb moisture is desirable for a textile fiber, because the fabrics made from them are more comfortable to wear. The low moisture absorption of many of the hydrophobic fibers now available is undesirable in many applications. A polymer with high water absorption characteristics also has interesting applications in film form, particularly as a replacement for leather in shoe uppers.

Although these copolymers possess many desirable properties, it is sometimes necessary to stabilize certain of the compositions to heat or radiation by ultra-violet light. Fortunately, this can be done very readily by incorporating stabilizers. Satisfactory stabilizers comprise phenols and their derivatives, amines and their derivatives, compounds containing both hydroxyl and amine groups, hydroxyazines, oximes, polymeric phenolic esters, and salts of multivalent metals in which the metal is in its lower valence state. An extensive list of suitable stabilizers is given in British Patent 779,054.

One of the important advantages of the polymers of this invention is that they are sufficiently stable to be melt-spun. Conventional procedures can be used for preparing films and filaments from these polymers. The elastic compositions are frequently tacky when freshly spun and require lubricating or talcing prior to winding up.

The other classical methods for shaping polymers can also be adapted quite readily to these polymers. For example, filaments can be prepared readily by dry spinning in conventional equipment. Talcing or lubricating is usually required for the elastic filaments but this does not represent a serious limitation. Solvents which have been found satisfactory for preparing solutions of suitable concentration for dry spinning are N,N-dimethylformamide, N,N-dimethylacetamide, tetramethylenesulfone, formic acid, and 60/40 1,1,2-trichloroethane/formic acid mixtures. Spinning speeds are usually lower than those used in some commercial dry spinning processes for textile filaments, although speeds in excess of 300 yards per minute have been attained with elastic filaments. This represents excellent productivity for filaments of this type. Spinning speeds are usually lower when wet spinning is used, but wet spinning processes have a definite advantage when larger denier filaments are being prepared. A preferred solvent for wet spinning is N,N-dimethylformamide and these solutions are usually extruded into a hot water bath.

When stable dispersions of these polymers (particularly the elastomers) can be prepared, the dispersion can be extruded and a shaped article prepared by coagulating the dispersion and coalescing the polymer particles. In some instances, heat coalescence is satisfactory, whereas for other polymers a solvent will have to be used to promote coalescence. Shaping and polymerization can also be combined into a single step. Although a drawing operation is not essential, the over-all properties of the films and filaments prepared from many of these copolymers are improved by a cold drawing operation which results in increased orientation and crystallinity in the final structure. Therefore, prior to final packaging, the yarns may be drawn at a suitable draw ratio, for example 2 to 10×, for the particular copolymer and relaxed, to give a product with a desired combination of tenacity, initial modulus, yarn elongation, elasticity, and similar properties.

The elastic polymer yarns of this invention are characterized by higher strength and stretch modulus and substantially better abrasion resistance than any rubber threads known. Stretch modulus measures the force required to elongate the yarn a given percentage. A garment of yarns having high tenacity and high stretch modulus will not only be durable but will also exert substantial pressure on the body of the wearer after the garment is stretched into position as desired, for example, in surgical stockings. Yarns of this invention have many advantages over rubber threads. For example, they may be spun readily into multifilament yarns and into low denier filaments. They have superior abrasion resistance, a very low inherent color, may be dyed by common dyestuffs, need no plasticizers which might later be leached out of the yarn, and have a good resistance to perspiration or greases and many other common chemicals. Furthermore, these elastic yarns are capable of very quick elastic recovery, a property which is lacking in many of the so-called elastic fibers.

Yarns from the elastic polymers of this invention are useful in woven, knitted, and non-woven fabrics for use in universal fitting apparel (socks, polo shirts, underwear, bathing suits, gloves, elastic cuffs, sweaters, waistbands, suits, coats, dresses, skirts, action sportswear, leotard-type outerwear, and accessories such as tapes, webbings and other woven, non-woven or knit apparel fabrics) household products (form-fitting upholstery, slip covers, sheets, carpets, mattress coverings, and narrow tapes and webbings for a wide variety of uses), industrial products (transportation upholstery, woven and non-woven felts, tapes and webbings for varied applications), and medical products (surgical bandages, supports, elastic dressings, surgical stockings, and splint tapes).

The elastic properties attained by this invention result in part from the novel combination of a segment of a "hard" or high melting polymer with a "soft" or low melting polymeric segment. The polymers from which the former segments are derived all melt above 200° C., some melting points being exemplified as follows: poly(hexamethylene sebacamide), 209° C.; poly(hexamethylene adipamide), 250° C.; polyurethane from piperazine and ethylene bis(chloroformate), 245° C.: polyurethane from piperazine and the bis(chloroformate) of 1,4-cyclohexanediol, 275° C.; poly(p,p'-methylenediphenyl urea), 305° C.; and poly(4-methyl-m-phenylene urea), 400° C. with decomposition. The melting points of the polyether glycols are below about 50° C., as for example, poly(tetramethylene oxide) glycol having an average molecular weight of 1000, about 20° C.; poly(tetramethylene oxide) glycol having a molecular weight of 1500, about 30° C.; and poly(tetramethylene oxide) glycol of 3000 molecular weight, about 40° C. The melting points of the polyether glycols are generally not sharp and may vary for a given molecular weight. Thus, some samples of the higher molecular weight polyether glycols may have apparent melting points as high as 55° C. The dicarboxylic acids derived from the isobutylene/butadiene copolymers are semi-solids at room temperature. The "hard" segments may be combined with the low melting segments to produce a large number of the elastomers of this invention.

It will be apparent that many widely different embodiments of this invention may be made without departing from the spirit and scope thereof, and therefore it is not intended to be limited except as indicated in the appended claims.

I claim:

1. A substantially linear segmented copolymer consisting essentially of a multiplicity of segments of two classes connected by chemical linkages, the segments of the first class being polymeric residues remaining after removal of the terminal amine groups of a difunctional polymer selected from the group consisting of primary and secondary amine-terminated polymers having a melting point below about 50° C. and a molecular weight above 600, said polymeric residues constituting at least about 48% by weight of said segmented copolymer, the segments of the second class containing at least one repeating unit of a fiber-forming polymer, said repeating unit being of the formula —B—Q—A—Q—, wherein —A— and —B— are bivalent organic radicals, the said radical —A— containing terminal nitrogen atoms to each of which is attached one of the indicated free valences of the said radical —A—, and Q is a bivalent radical selected from the group consisting of

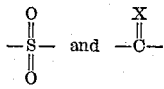

the said fiber-forming polymer having a melting point above about 200° C. in the fiber-forming molecular weight range, said segments of the second class being connected by chemical linkages selected from the group consisting of

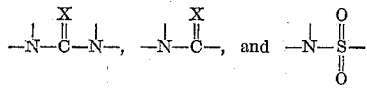

wherein X is selected from the group consisting of oxygen and sulfur, through an

of said linkages to a terminal carbon atom of the segments of the first class, with the proviso that said segmented copolymer be free of nitrogen-to-nitrogen bonds in the polymer chain.

2. A substantially linear segmented copolymer consisting essentially of a multiplicity of segments of two classes connected by amide linkages, the segments of the first class being polymeric residues remaining after removal of the terminal amine groups of a difunctional polymer selected from the group consisting of primary and secondary amine-terminated polymers having a melting point below about 50° C. and a molecular weight above 600, said residues constituting at least about 48% by weight of said segmented copolymer, the segments of the second class containing at least one repeating unit of a fiber-forming polymer, said repeating units being of the formula $$-B-\overset{O}{\underset{\|}{C}}-A-\overset{O}{\underset{\|}{C}}-$$

wherein —A— and —B— are bivalent organic radicals, the said radical —A— containing terminal nitrogen atoms to each of which is attached one of the indicated free valences of the said radical —A—, the said fiber-forming polymer having a melting point above about 200° C. in the fiber-forming molecular weight range, said segments of the second class being connected by amide linkages of the formula

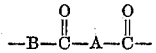

through the

of said linkage to a terminal carbon atom of the segments of the first class, with the proviso that said segmented copolymer be free of nitrogen-to-nitrogen bonds in the polymer chain.

3. The copolymer of claim 2 in which said difunctional polymer is an amine-terminated polyhydrocarbon.

4. The process of preparing a synthetic linear segmented copolymer which comprises reacting a difunctional polymer selected from the group consisting of primary and secondary amine-terminated polymers having a molecular weight of at least about 600 and a melting point below about 50° C. with at least two difunctional complementary monomers capable of independently forming together a linear fiber-forming polymer having a melting point above about 200° C. in the fiber-forming molecular weight range, at least one of said organic monomers being capable of reacting with the terminal functional groups of said difunctional polymer to form chemical linkages selected from the group consisting of urea and amide, and at least one of said monomers having two reactive functional groups containing nitrogen, said difunctional polymer being present in said reaction in an amount to provide at least about 48% by weight of said segmented copolymer.

5. The process of preparing a synthetic linear segmented copolymer which comprises reacting a difunctional polymer selected from the group consisting of primary and secondary amine-terminated polymers having a molecular weight of at least about 600 and a melting point below about 50° C. with a diacid halide and an organic diamine, said diacid halide and said organic diamine being capable of forming a linear fiber-forming polyamide having a melting point above about 200° C. in the fiber-forming molecular weight range, said amine-terminated polymer being present in said reaction in an amount to provide at least about 48% by weight of said segmented copolymer.

6. The process of claim 5 wherein said amine-terminated polymer is an amine-terminated polyether.

7. The process of claim 5 wherein said amine-terminated polymer is present in said reaction in an amount to provide from about 60% to about 90% by weight of said segmented copolymer.

8. The process of claim 5 wherein said amine-terminated polymer is an amine-terminated polyhydrocarbon.

9. The copolymer of claim 2 in which said difunctional polymer is an amine-terminated polyether.

10. The copolymer of claim 9 in which the polyether is an amine-terminated poly(alkylene oxide).

11. The copolymer of claim 10 in which the polyether is an amine-terminated poly(tetramethylene oxide).

12. The copolymer of claim 2 in which about 60% to about 90% of its weight is made up of the said segments of the first class.

13. The copolymer of claim 2 which has an elastic recovery above about 90% and a stress decay of less than about 20%.

14. A filament made from a copolymer of claim 2.

15. A filament of claim 14 having a fiber-stick temperature above 150° C.

16. A film made from a copolymer of claim 2.

References Cited in the file of this patent
UNITED STATES PATENTS

| | | |
|---|---|---|
| 2,172,374 | Flory | Sept. 12, 1939 |
| 2,359,833 | Faris | Oct. 10, 1944 |
| 2,547,113 | Drewitt et al. | Apr. 3, 1951 |
| 2,647,146 | Arthur | July 28, 1953 |
| 2,828,291 | Saunders | Mar. 25, 1958 |
| 2,831,834 | Magat | Apr. 27, 1958 |
| 2,877,212 | Seligman | Mar. 10, 1959 |
| 2,929,803 | Frazer | Mar. 22, 1960 |